(12) United States Patent
Aoshima et al.

(10) Patent No.: US 7,136,996 B2
(45) Date of Patent: Nov. 14, 2006

(54) ONE-TIME LOGON METHOD FOR DISTRIBUTED COMPUTING SYSTEMS

(75) Inventors: Tatsundo Aoshima, Kawasaki (JP); Mitsunobu Tasaka, Kawasaki (JP); Kei Takeda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 853 days.

(21) Appl. No.: 10/081,486

(22) Filed: Feb. 20, 2002

(65) Prior Publication Data

US 2003/0110401 A1    Jun. 12, 2003

(30) Foreign Application Priority Data

Dec. 11, 2001   (JP)   ............... 2001-376575

(51) Int. Cl.
*H04L 9/00* (2006.01)
*H04L 9/32* (2006.01)
*H04K 1/00* (2006.01)
*G06F 7/04* (2006.01)
*G06F 17/00* (2006.01)

(52) U.S. Cl. ............... 713/155; 726/7; 726/8; 713/168; 713/183

(58) Field of Classification Search ............... 713/155, 713/168, 172, 186, 202, 183; 709/229; 705/50, 705/76; 726/7, 8, 2
See application file for complete search history.

(56) References Cited

U.S. PATENT DOCUMENTS 5,241,594 A * 8/1993 Kung ................. 713/155

2002/0184217 A1 * 12/2002 Bisbee et al. .............. 707/9

FOREIGN PATENT DOCUMENTS

JP    2000-259709 A    9/2000

OTHER PUBLICATIONS

Lamport, Lesile, "Password Authentication with Insecure Communication", Communications of the ACM, Nov. 1981, vol. 24, No. 11, pp. 770-772.*

* cited by examiner

*Primary Examiner*—Emmanuel L. Moise
*Assistant Examiner*—Courtney Fields
(74) *Attorney, Agent, or Firm*—Townsend and Townsend, and Crew LLP

(57) ABSTRACT

Prior to authentication, a business system generates a password list and sends the password list to a commercial service system. A request for use of the commercial service system is sent from a terminal that a user is using to the business system. In response to this, the business system that received the request for use checks the request for use of a commercial service use authority of the user. A password is selected from the password list and returned to the terminal. The terminal sends the returned password to the commercial service system. The commercial service system compares the password with a password in accounting information including the password list. If they match, login is permitted and the used password is nullified.

5 Claims, 2 Drawing Sheets

ONE-TIME LOGON METHOD FOR DISTRIBUTED COMPUTING SYSTEMS

BACKGROUND OF THE INVENTION

The present invention relates to a login authentication technique that allows a user who is using a business system to use a commercial service system safely and enables multiple users who are using the business system to share an account of the commercial service system.

At present, a user frequently uses various commercial services via an intranet business system and the Internet at the same time. The intranet business system performs login authentication to enable processing in accordance with the user's official authority. However, if a service via the Internet is charged, the login authentication is required for utilization of the service. The following requirements are provided for utilization of these multiple systems.

(1) When a user uses a commercial service system from inside an enterprise, the user needs not to be aware of the system or service that the user is using. That is, the login authentication of the commercial service system needs not to be performed explicitly.

(2) Because in-house users who can use a commercial service system must be limited in accordance with their official authority, security concerning information (accounting) about login authentication needs also to be considered. That is, even if a password is leaked to another user, the password is rejected by the login authentication.

(3) Because a business system that is already operating and a commercial service may be linked, a load on the business system is minimized.

(4) Because it is mostly unrealistic from the standpoint of accounting that accounts for in-house users who use a commercial service are secured, multiple in-house users can share an account.

To satisfy the requirement (1), a method for transferring a special key generated in accordance with a protocol arranged between a business system and a service system to a client (terminal) is considered so that the commercial service can directly be used from the client. In this case, to satisfy the requirement (2), a fixed user ID and a password in the normal login authentication cannot be used as the key. To realize the above login authentication function, utilization of what is called a one-time password is considered. The prototype of the one-time password is a Lamport's Hash algorithm, and is described in 'Password Authentication with Insecure Communication' by Leslie Lamport of "Communications of the ACM, Volume 24, Issue 11 (November 1981)", pages 770 to 772.

SUMMARY OF THE INVENTION

In a Lamport's hash algorithm, a password that will be used next is determined by inquiring an numerical value n that indicate show far the password was consumed and the service system side ought to store this n and only the corresponding hash value. However, there are the following two problems to apply this one-time password to the business system and the commercial service system.

The first problem is that because communication is performed between the business system and the service system in accordance with the Lamport's hash algorithm, the communication needs to be performed multiple times between the business system and the service system, thereby increasing the load of the business system.

The second problem is that only one hash value is stored at the service side and one account cannot be used by multiple persons at the same time.

An object of the present invention is to provide a login authentication method for reducing traffic and enabling concurrent utilization of one account by the multiple persons and its implementation system.

According to the method described in a first aspect of the present invention, because the communication that inquires how far a password has been used at present needs not to be performed, the traffic can be reduced. Further, according to the method described in claim 2 or 3, all passwords have previously been sent to the commercial service system, multiple persons can perform login processing at the same time.

DESCRIPTION OF THE PREFERRED EMBODIMENTS

One embodiment of the present invention is described below.

Figure 1:
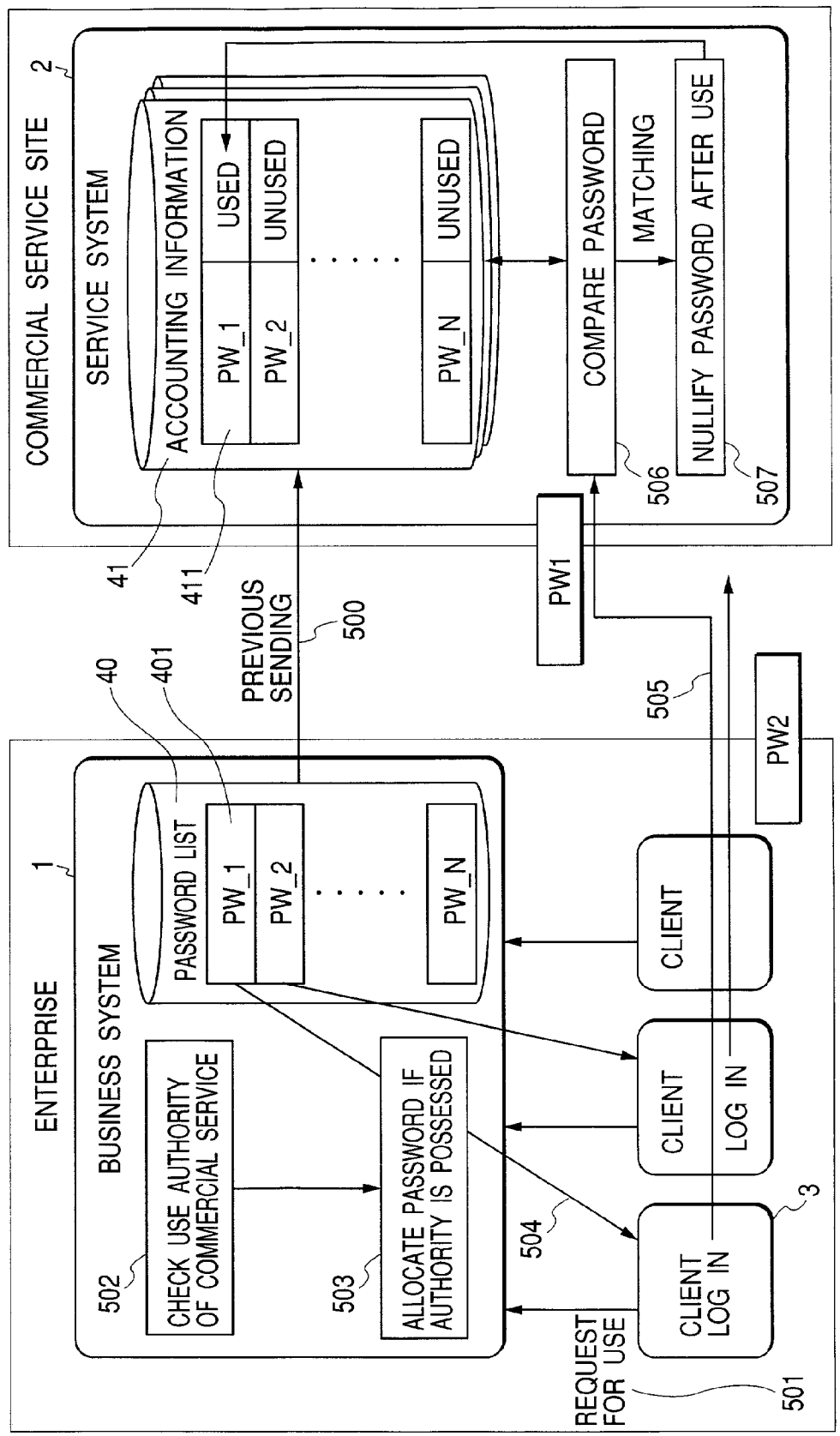
FIG. 1 is a general drawing of a processing method according to one example of the present invention.

FIG. 1 shows a general drawing of a processing method according to one example of the present invention. In an enterprise, there are a business system 1 and a client 3 (terminal or computer) that a user uses. The user logs in the business system 1. Further, the user also uses a service system that exists in an external commercial service site. A commercial service system has accounting information 41 every user to manage the user. The case where multiple users share and use this accounting information 41 is considered.

Prior to login authentication, a password list 40 is generated in a business system. There are N passwords in this password list 40. Here, an individual password is assumed to be generated from a random number. This password list 40 is sent 500 to a service system 2 and stored in the password of the accounting information 41. Further, each password stores a pair of flags that indicate whether this password is already used or unused. The initial value of this flag is unused. When the user uses a commercial service, the user sends 501 a request for use of the commercial service system 2 from the client 3 that the user is using to the business system 1.

The business system 1 that received the request for use checks 502 a commercial service use authority of the user. If the use authority is provided, any password 401 is selected 503 from the password list 40 and returned 504 to a client.

To prevent that the selected password is allocated to a clients again, the selected password is eliminated from the password list or the line for the selected password is made blank.

The client 3 sends 505 the returned password to the commercial service system 2. The commercial service system 2 makes a comparison 506 with a password within the accounting information 41, and permits login if a matching password (411 in this case) is provided. Further, the commercial service system 2 changes a flag paired with the used password to the used flag in order to nullify 507 the used password.

In a series of processing described above, login authentication processing can be performed by multiple users to one account at the same time by always allocating a different password to each user.

The one embodiment was described above, but as a modification example of this example, an example when one-time password algorithm is modified and applied to a processing method of the present invention is described below.

Figures 2, 3:
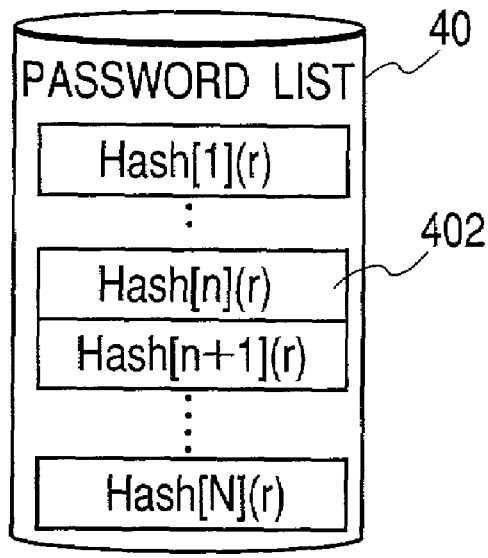
FIG. 2 is a block diagram of the password list of the present invention.
FIG. 3 is a general drawing of the processing method in the accounting information of the present invention.

A second example in which the password list 40 in a first example was replaced is described using the password list of FIG. 2. At this point, an individual password is generated by sequentially applying a hash function to an optional initial value r. Here, Hash[n] (r) 402 indicates the result in which the hash function is applied to r n times (402).

Prior to login authentication, a business system sends 500 the total applicable number of times N of the hash function and only Hash[N] (r) to the service system 2.

A third example in which the accounting information 41 in the first example was replaced is described using the accounting information of FIG. 3. Here, each password stores the applicable number of times of the hash function and a pair of flags that indicate whether this password is already used or unused (412). In the initial state, the accounting information stores Hash[N] (r), N, and only unused pair of flags.

When a request for use of a commercial service is received from a user, the password selection processing 503 of the business system 1 allocates a password sequentially from the password of which the applicable number of times n is high.

The return processing 504 to a client also returns the password 402 and the applicable number of times n. The comparison processing 506 in the commercial service system 2 compares the result (Hash[N−n] (password) in which a hash function was applied to the password Hash[n] (r) sent from the client only for the part in which the applicable number of times n was subtracted from the total number of applicable times N and a numerical value of Hash[N] (r), and permits login if they match.

An example for reducing computational complexity of a hash function in the commercial service system 2 is shown. Because the comparison processing 506 in the commercial service system 2 performs computation to which the hash function is applied multiple times, each intermediate result is added to the accounting information 41. Here, when the computation is performed until the applicable number of times is set to m, the computation of the hash function results in Hash[m−n] (password) and the result is compared with Hash[m] (r). On this occasion, the intermediate result from the applicable number of times n to m is stored. Subsequently, in the compare processing of the password of which the applicable number of times is higher than n and lower than m, the hash function is not computed.

A user can use a business system and a commercial service system without needing to be aware of the system or service that the user is using.

A business limit indicating that "Only a specific user can use a commercial service" can be satisfied safely.

The traffic between the business system and the commercial service system can be reduced.

Further, one account of the commercial service system can be shared by multiple persons.

As a result, the traffic is reduced and the concurrent utilization of the one account by the multiple persons is enabled.

The invention claimed is:

1. A computer system including a business system and a commercial service system comprising:
   a terminal from which a user may send a request for use of the commercial service system to the business system when a user logs in to the business system;
   the business system including a password list having a plurality of passwords for users, and in response to the user request the business system checks authority for use of the commercial service system by the user, selects a password from the password list if the user has authority, and sends the password selected to the terminal;
   the commercial service system including financial information configured on the basis of the passwords sent from the business system, whereby the financial information includes a plurality of passwords different from each other to permit use of information in one account by a plurality of the users;
   wherein the terminal sends the selected password to the commercial service system; and
   the commercial service system compares the password from the terminal with a password previously provided, permits login if they match, and then designates the password as used and thereby prevent its subsequent reuse.

2. The computer system according to claim 1 wherein the business system generates the password list by using a random number, then sends the password list to the commercial service system for association with the financial information.

3. The computer system according to claim 1 wherein the commercial service system generates the passwords using a random number then sends the password list to the business system for association with the financial information.

4. The computer system according to claim 1 wherein the business system includes a password generating system which:
   generates the password list using an arbitrary numerical value and a one-way function applied repeatedly;
   sends the arbitrary numerical value and the number of times the one-way function was applied to the commercial service system, and associates that with the accounting information;
   returns the password and the number of times the one-way function was applied to the terminal; and
   compares the result in which the one-way function was applied to the password sent from the terminal for fewer than the number of times the one-way function was applied.

5. The computer system according to claim 1 wherein each password stores a flag indicating whether the password has been used.

* * * * *